United States Patent [19]

Butcher

[11] 4,114,927
[45] Sep. 19, 1978

[54] TUBE COUPLING FOR VACUUM CLEANERS

[76] Inventor: Norman P. Butcher, 702 Sheridan Rd., Normal, Ill. 61761

[21] Appl. No.: 813,443

[22] Filed: Jul. 7, 1977

[51] Int. Cl.² .............................................. F16L 37/08
[52] U.S. Cl. ...................................... 285/7; 285/317; 285/DIG. 22
[58] Field of Search ..................... 285/7, DIG. 22, 317

[56] References Cited

U.S. PATENT DOCUMENTS

| 2,102,802 | 12/1937 | Lofgren | 285/317 X |
| 2,582,446 | 1/1952 | Martinet | 285/7 |
| 3,164,351 | 1/1965 | Rembowski | 285/DIG. 22 X |
| 3,214,187 | 10/1965 | Fuerst | 285/DIG. 22 X |
| 3,950,014 | 4/1976 | Doubleday | 285/DIG. 22 X |

Primary Examiner—Thomas F. Callaghan
Attorney, Agent, or Firm—Alfred E. Miller

[57] ABSTRACT

A wand assembly for a vacuum cleaner comprised of a pair of tubes, one of which is adapted to be telescopically fit into the other. The tubes are held together by a button resiliently biased to extend through alignable holes in the tubes. The resilient biasing of the button is provided by a spring within the inner tube and affixed to the inner walls of the inner tube at a pair of positions longitudinally spaced on opposite sides of the hole through which the button extends.

9 Claims, 6 Drawing Figures

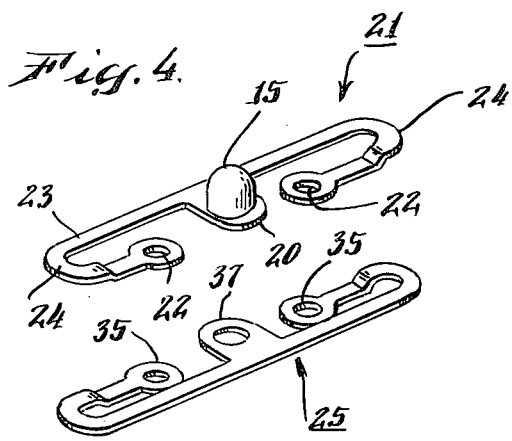
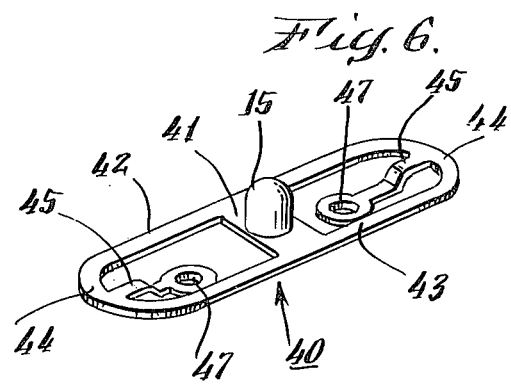
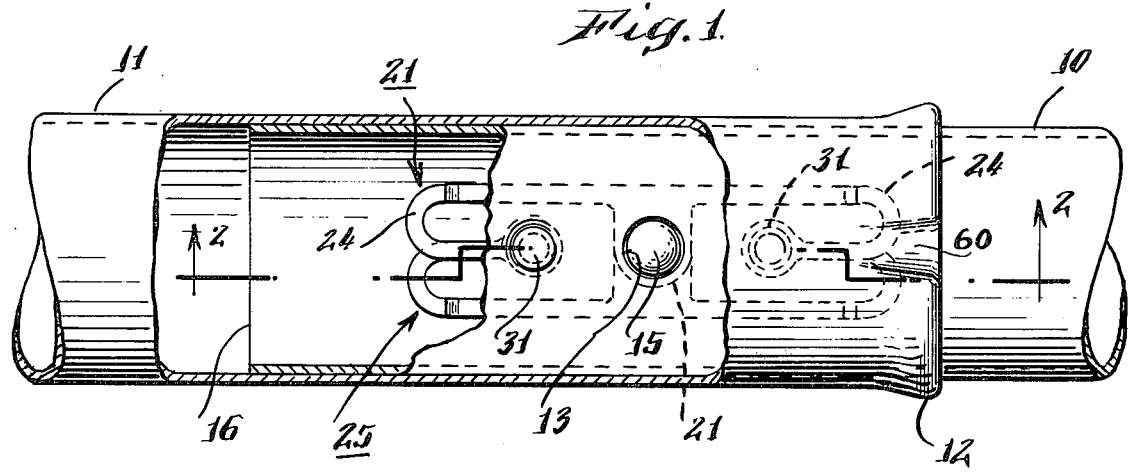
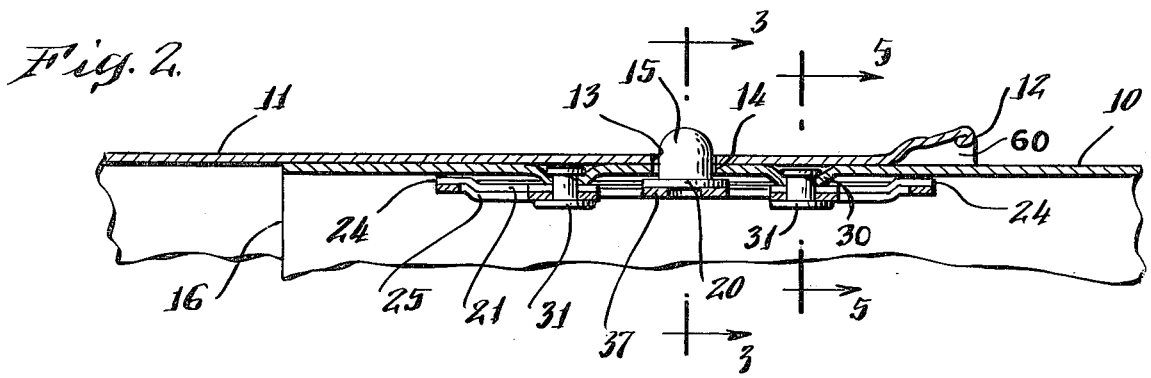
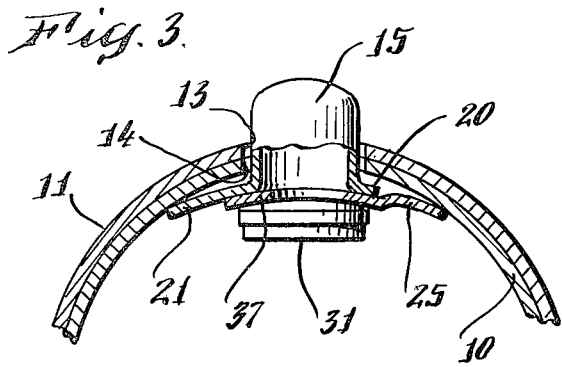
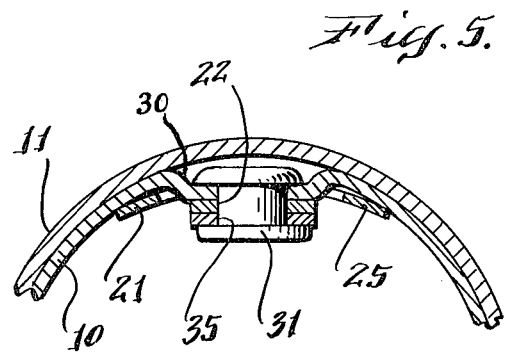

TUBE COUPLING FOR VACUUM CLEANERS

BACKGROUND OF THE INVENTION

This invention relates to coupling arrangements for a pair of tubes particularly of the type wherein one tube is adapted to telescopically slide into the end of another tube, and the invention is particularly concerned with the provision of such a device for the suction tubes of a vacuum cleaner wherein the tubes must be adapted to be readily and simply connected and disconnected.

Coupling arrangements of the above type are generally known. In one type of coupling, for example, and outer suction tube is provided with a hole spaced from one end thereof, and a lip extending outwardly from the open end to enable the guiding of a button toward the hole. In this arrangement, the inner of the tubes also has a hole, which is alignable with the hole of the outer tube. A button is resiliently held in the hole of the inner tube, so that the button may be aligned with the lip of the outer tube and rapidly directed into locking position to extend through the hole of the outer tube. In this arrangement, the spring for resiliently holding the button consists of a simple leaf spring affixed at one end to the inside of the inner tube, and affixed at the other end to the inside end of the button.

With the above arrangement, a stop, generally in the form of an indentation, is provided in the outer tube in order to inhibit the forcing of the inner tube into the outer tube to positions beyond which the two holes are aligned. In structures of this type it was considered necessary to provide this alignment stop, since the tubes are generally assembled rapidly without particular attention being paid to the relative alignment of the two holes.

The above known arrangement has the further disadvantage that the relative positioning of the holes, latch and stop present some tolerance problems in the production of the structure. In addition, such arrangements generally are limited to the provision of a relatively short spring which has limited flex life.

SUMMARY OF THE INVENTION

The present invention is therefore directed to the provision of a wand locking system that overcomes the above disadvantages of known wand locking devices. Briefly stated, in accordance with the invention, a wand locking device comprises a button resiliently biased substantially solely in the radial direction to extend through alignable apertures in the wand tubes. The biasing springs comprise elongated flat spring elements affixed to the inside of the inner of the tubes, for example, by riveting, at two locations aligned in opposite longitudinal or axial directions with respect to the aperture in the inner of the two tubes. The spring or springs have portions longitudinally spaced from the sides of the button and joined at the ends thereof by loop-shaped portions, the loop-shaped portions being affixed to the inner tube. Transversely extending sections extending centrally of the longitudinally extending portions are aligned radially with the button.

In one advantageous embodiment of the invention, the springs are comprised of two generally c-shaped metal spring elements having central arms extending to support the button. In a further embodiment of the invention, the spring may be formed as a unitary element of a resilient plastic material.

In the arrangement of the invention, since the button is biased to move substantially solely in a radial direction, the straight sides of the button can adequately interlock the two tubes together so that the button will not spring out of the holes in the tubes during assembly by an operator. Further, due to the extension of the springs beyond their fixing points to the inner of the tubes, the springs are thereby lengthened and their flex life substantially increased.

In order that the invention will be more clearly understood, it will now be disclosed in greater detail with reference to the accompanying drawings wherein:

FIG. 1 is a side view of a partial and cross-section of a pair of wands employing the locking device of the invention;

FIG. 2 is a cross-sectional view of a portion of the locking arrangement of FIG. 1 taken along the lines 2—2 of FIG. 1;

FIG. 3 is a partial transverse cross-section of the locking device of the invention, taken along the lines 3—3 of FIG. 2;

FIG. 4 is an exploded view of one embodiment of the springs employed in the wand locking arrangement of FIGS. 1—3;

FIG. 5 is a transverse cross-sectional view of the locking device of FIG. 2 taken along the lines 5—5 of FIG. 2; and FIG. 6 is a perspective view of a modification of the spring in accordance with the invention.

DESCRIPTION OF THE PREFERRED EMBODIMENT

Referring now to the drawings, therein is illustrated a wand lock, in accordance with the invention, for releasably locking together wand sections 10 and 11, as illustrated in FIGS. 1 and 2. The wand sections 10 and 11 are tubular elements, adapted to be readily locked together and separated as desired in the use of a vacuum cleaner. For this purpose, the wand section 11 has an inner diameter slightly greater than the outer diameter of the wand section 10, so that the wand section 10 may be telescoped within the wand section 11. Further, the end 12 of the wand section 11 into which the wand section 10 is to be inserted is flared, as indicated at 12, with the end thereof preferably being beaded as shown to increase its strength. As illustrated in FIGS. 2 and 3, the wand section 11 is provided with a hole 13 spaced from the end 12, and the wand section 10 is provided with a hole 14 of similar diameter and spaced from the end 15 thereof inserted within the wand section 11. The hole 14 is therefore alignable with the hole 13.

The lock, in accordance with the invention, is comprised of a button 15 resiliently held on the inside of the wand section 10 to extend through the holes 14 and 13 when they are aligned as illustrated in FIG. 3. The holes 13 and 14 are preferably round and the button 15 also preferably has a round cross-section. The button 15, however, may be hollow as shown in FIG. 3, with the closed end 16 thereof being slightly rounded. The construction of the button and the resilient mounting therefor is more clearly seen in the exploded view of FIG. 4, wherein the button 15 is shown affixed to or forming an integral part of a central sidewise extending arm 20 of a generally flat spring 21. The spring 21 is generally elongated, and has a pair of mounting apertures 22 aligned with the button 15 longitudinally with respect to its mounting position and the locking assembly. The spring 21 further has a longitudinally extending generally straight portion 23 displaced from the side of the center portion 20 and connected thereto. The longitudinally extending portion 23 extends longitudinally beyond the portions thereof with the holes 22, and the ends of the generally straight section are connected with the portions surrounding these holes by loop-shaped portions 24. The spring 21 may, therefore, be considered to be generally c-shaped, with a central arm supporting the button 15. This shape, of course, enables the button 15 to be resiliently moved in a direction normal to the line adjoining the two holes 22, without stretching the material of the spring. The spring 21 is preferably, although not necessarily, of a resilient metallic material and, as above discussed, the button 15 may either be formed as a part of the spring or attached thereto by conventional means, such as welding or riveting. In order to provide balanced mounting and resilient action of the locking button, a further spring 25 is provided having a shape similar to that of the spring 21 but with the position of the spring 25 being reversed to extend along the other side of the button.

It will be noted in FIG. 4 that the portions of the spring through which the holes 22 extend are slightly displaced from the plane of the spring. This displacement simplifies mounting of the springs by conventional means while enabling the remaining portion of the spring to conform generally to the inside surface of the wand section 10. Thus, as illustrated in FIGS. 4 and 5, the wand section 10 is slightly indented as indicated at 30 to accommodate the heads of rivets 31 at two positions longitudinallly aligned with and on opposite sides of the hole 14. The rivets thus extend through the holes 22 of the spring 21, and the corresponding holes 35 of the spring 25, and are headed over within the spring 25 as indicated at 36. This is shown more clearly in FIG. 5.

In the above described construction of a locking device for a pair of wands, as noted in FIGS. 3 and 5, the springs 21 and 25 may, if desired, be slightly rounded circumferentially of the wand structure. It is not necessary for the center circumferentially extending portion 37 of the spring 25 to be affixed to the button, since the button 15 is firmly held by the spring 21. The spring 25 thereby serves to more positively align the button so that it can move only radially of the wand section 10. The springs employed for resiliently holding the button are considerably longer than springs of the type which merely enable arcuate movement of a button, and, as a consequence, the life of this spring, in accordance with the invention, is greatly extended. The two spring sections 21 and 25 are employed in this embodiment of this invention, in view of the difficulty of forming a piece construction of this type employing metal springs.

In an alternative form of the spring of the invention, as illustrated in FIG. 6, the spring 40 may be molded of a single piece of plastic material, the button 15 being also molded with the spring. This arrangement has a disadvantage, however, that possible sharp edges on the holes of the wand sections may result in abrading of the plastic after some usage.

In the spring of FIG. 6, the button 15 is mounted or formed on a central circumferentially extending arm 41 affixed at its end to a longitudinally extending portion 42. A similar longitudinally extending portion 43 is provided on the opposite side of the button 15 and the longitudinally extending portion 42 and 43 are joined at their ends by semi-circular portions 44. Arms 45 extend inwardly (i.e. toward the button 15) from the insides of the centers of the semi-circular portions 44 with suitable mounting apertures 47 being formed in the arms 45. The overall configuration of the spring of FIG. 6 is, hence, quite similar to that of the pair of springs 21 and 25 of FIG. 4 with the button 15 being mounted on the bridge 41 which joins the center of the longitudinally extending portions 42 and 43.

The spring of FIG. 6 is, of course, mounted to the wands in the same manner as the spring assembly of FIG. 4.

In accordance with the invention, since the button 15 moves directly radially of the wand section 10, it is not necessary to provide an internal stop in the wand section 11 in order to inhibit excessive extension of the wand section 10 in the wand section 11. The wand section 11, however, is preferably provided with a lip or spout 60 at the end 12 thereof, in order to generally direct the button 15 towards the hole 13. Thus, on assembly, the user aligns the button 15 with the lip or spout 60 and then merely shoves the wand section 10 longitudinally in the wand section 11. The button 15 will be resiliently forced inwardly by the lip, and then the inner wall of the wand section 11, and will spring out to lock the elements together upon reaching of the hole 13. This will effect the locking of the two wand sections together and the locking will positively occur even though the inserting was effected rapidly, and without the use of a stop, as opposed to the known arrangements.

The wands may, of course, be separated in known manner simply by depressing the button and withdrawing the wand section 10 from the wand section 11. While the invention has been disclosed and described with reference to a limited number of embodiments, it will be apparent that variations and modifcations may be made therein, and it is, therefore, intended in the following claims for each such variation and modification as falls within the true spirit and scope of the invention.

What is claimed is:

1. A coupling comprising a first rigid tubular member having an open end, a second rigid tubular member having an outer diameter at one end slidably fitting within said open end of said first tubular member, and means for releasably locking said tubular members together comprising first and second alignable holes in said first and second tubular members respectively, a button extending through said first and second holes, and spring means within said second tubular member, said spring means comprising a flat resilient member affixed within said second tubular member at two positions longitudinally spaced in opposite directions from said hole, and having a central portion held to said button, said resilient member having apertures extending therethrough in regions directly between each of said two positions and said second hole, whereby said button is resiliently biased radially outwardly with respect to said second tubular member.

2. The coupling of claim 1 wherein said first tubular member has an outwardly extending lip longitudinally aligned with the hole therein for directing said button toward said hole during assembly of said first and second tubular member.

3. The coupling of claim 1 wherein said button, first and second holes, and spring means comprise the sole stop means inhibiting longitudinal movement of said second tubular member in said first tubular member.

4. The coupling of claim 1 wherein said flat resilient member has a longitudinally extending portion circumferentially spaced on one side of said two positions, a loop-shaped portion extending from each of said two positions in opposite directions and joining the ends of said longitudinally extending portion, and a central portion extending circumferentially from said longitudinally extending portion and affixed to said button.

5. The coupling of claim 4 wherein said spring means further comprises a second flat resilient member having a longitudinally extending portion based on the other side of said two positions and joined to said two positions by loop-shaped portions extending in opposite directions, and a central portion extending circumferentially and having a hole through which said button extends.

6. A coupling tube for a suction wand of a vacuum cleaner, comprising a rigid tube having a hole spaced from one end thereof, spring means within said tube and rigidly affixed to said tube at positions longitudinally spaced in opposite directions from said hole, whereby said two positions and hole are longitudinally in line, said spring means having a circumferentially extending central portion extending into alignment with said hole, and a loop-shaped portion extending from each of said two positions to opposite ends of said central portion, whereby said spring means is apertured directly between said hole and each of said two positions, and a button held to said central portion and extending through said hole whereby said button is resiliently biased and guided for movement directly radially with respect to said tube.

7. The coupling tube of claim 6 wherein said central portion of said resilient means is comprised of first and second flat elements extending longitudinally on opposite sides of said hole and having central circumferentially extending portions extending into alignment with said hole, whereby one of said circumferentially extending sections is affixed to said button, and further comprising a loop-shaped portion joining each end of each of said longitudinally extending portions to one of said fixed positions.

8. In a vacuum cleaner wand assembly, wherein a first wand tube has a hole spaced from one open end thereof and a lip for guiding a button to said hole, a second wand tube has an outer diameter so that it may be telescoped into said open end of said first wand tube, said second wand tube having a hole spaced from the open end thereof, and a button extending through the hole of said second wand tube and resiliently biased outwardly by spring means within said second wand tube, said spring means being affixed to the inner wall of said second tube at a point longitudinally spaced in one direction from said hole in said second tube, whereby said wand tubes may be assembled with said button extending through said hole in said first wand tube; the improvement wherein said spring means for resiliently biasing and holding said button is also affixed to the inner wall of said second tube at a point longitudinally spaced from the hole therein in the direction opposite said one direction, said spring means resiliently urging said button in a direction directly radially with respect to said wand tubes and having apertures located directly between each of points and said hole in said second tube, whereby excessive insertion of said inner wand tube into said outer wand tube is inhibited, said resilient means holding said button against separation from said assembly.

9. The assembly of claim 8 wherein said spring means comprises first and second substantially identical flat spring elements each having a generally straight portion joined at its ends to oppositely directed loop-shaped portions, and a central portion extending from the straight portion thereof into alignment with the ends of said loop-shaped portions, said elements being affixed within said second wand tube with the free ends of said loop-shaped portions being affixed to said second wand tube at positions longitudinally spaced on opposite sides of the hole in said second wand tube, the central portion on one of said elements being affixed to said button.

* * * * *